United States Patent

Hyndman

[11] Patent Number: 5,421,122
[45] Date of Patent: Jun. 6, 1995

[54] PLANT WATERING APPARATUS

[76] Inventor: Olan Hyndman, 105 Leemar Pl., Hot Springs, Ark. 71901

[21] Appl. No.: 226,834

[22] Filed: Apr. 13, 1994

[51] Int. Cl.⁶ .......................................... A01G 29/00
[52] U.S. Cl. ........................................ 47/48.5; 47/67; 248/318
[58] Field of Search ............. 47/48.5 G, 67; 239/273; 248/318

[56] References Cited

U.S. PATENT DOCUMENTS

| | | | |
|---|---|---|---|
| 599,996 | 3/1898 | Engle | 47/67 |
| 1,063,395 | 6/1913 | Scribner | 47/67 |
| 2,448,563 | 9/1948 | Wetzel | 248/318 |
| 3,867,788 | 2/1975 | Mickelson | 248/318 |
| 3,930,334 | 1/1976 | Johnston . | |
| 3,981,099 | 9/1976 | Dziewulski | 47/67 |
| 4,084,779 | 4/1978 | Moineau | 248/318 |
| 4,138,803 | 2/1979 | Sherlock | 47/67 |
| 4,156,396 | 5/1979 | Konucik | 47/48.5 G |
| 4,170,089 | 10/1979 | Smrt . | |
| 4,562,959 | 1/1986 | Pointer, Jr. . | |
| 4,592,166 | 6/1986 | Tendrup et al. | 47/67 |
| 4,601,130 | 7/1986 | DuVall | 47/41.12 |
| 4,744,171 | 5/1988 | Hilliard | 47/67 |
| 5,052,149 | 10/1991 | Johnson | 47/67 |
| 5,062,239 | 11/1991 | Helton . | |
| 5,097,626 | 3/1992 | Mordoch . | |
| 5,157,868 | 10/1992 | Munoz | 47/79 |

FOREIGN PATENT DOCUMENTS

| | | | |
|---|---|---|---|
| 5603 | of 1927 | Australia | 47/67 |
| 1217816 | 5/1960 | France | 47/48.5 G |
| 2147484 | 5/1985 | United Kingdom | 47/67 |

OTHER PUBLICATIONS

Family Circle, Jun. 1975, "24 Hanging Planters to Make".

Primary Examiner—Ramon S. Britts
Assistant Examiner—Joanne C. Downs

[57] ABSTRACT

A container is arranged to include a flange to permit support of the container in a suspended orientation over a plant to be watered, with the container including a valve head permitting metering of fluid from the container to the underlying plant.

6 Claims, 2 Drawing Sheets

PLANT WATERING APPARATUS

BACKGROUND OF THE INVENTION

1. Field of the Invention

The field of invention relates to plant watering structure, and more particularly pertains to a new plant watering apparatus wherein the same is directed to the metered watering of plants positioned beneath the container structure.

2. Description of the Prior Art

The prior art has indicated the utilization of plant watering structure and such structure is indicated in the U.S. Pat. Nos. 3,930,334; 5,062,239; 5,097,626; 4,170,089; and 4,562,959.

The instant invention attempts to overcome deficiencies of the prior art by providing for a container structure positioned and arranged for ease of use and effectiveness in construction to effect watering of an underlying plant and in this respect, the present invention substantially fulfills this need.

SUMMARY OF THE INVENTION

In view of the disadvantages inherent in the known types of plant watering apparatus now present in the prior art, the present invention provides a plant watering apparatus including a container having a valve head arranged for selective metering of fluid from the container to an underlying plant.

To attain this, the present invention provides a container arranged to include a flange to permit support of the container in a suspended orientation over a plant to be watered, with the container including a valve head permitting metering of fluid from the container to the underlying plant.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is an object of the present invention to provide a new plant watering apparatus which may be easily and efficiently manufactured and marketed.

It is a further object of the present invention to provide a new plant watering apparatus which is of a durable and reliable construction.

An even further object of the present invention is to provide a new plant watering apparatus which is susceptible of a low cost of manufacture with regard to both materials and labor, and which accordingly is then susceptible of low prices of sale to the consuming public, thereby making such plant watering apparatus economically available to the buying public.

Still yet another object of the present invention is to provide a new plant watering apparatus which provides in the apparatuses and methods of the prior art some of the advantages thereof, while simultaneously overcoming some of the disadvantages normally associated therewith.

Even still yet another object of the present invention is to provide a new plant watering apparatus which provides a container arranged to include a flange to permit support of the container in a suspended orientation over a plant to be watered, with the container including a valve head permitting metering of fluid from the container to the underlying plant.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
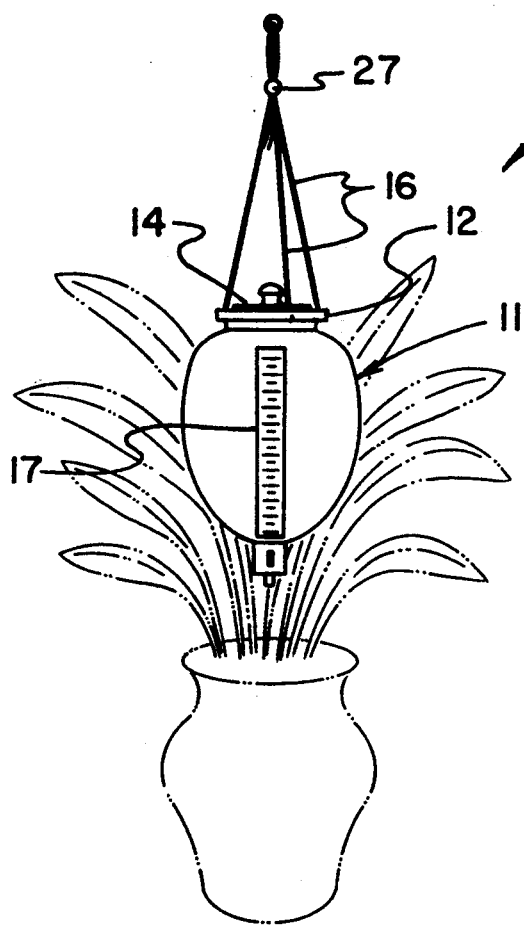
FIG. 1 is an isometric illustration of the plant watering apparatus positioned over a plant.
Figure 2:
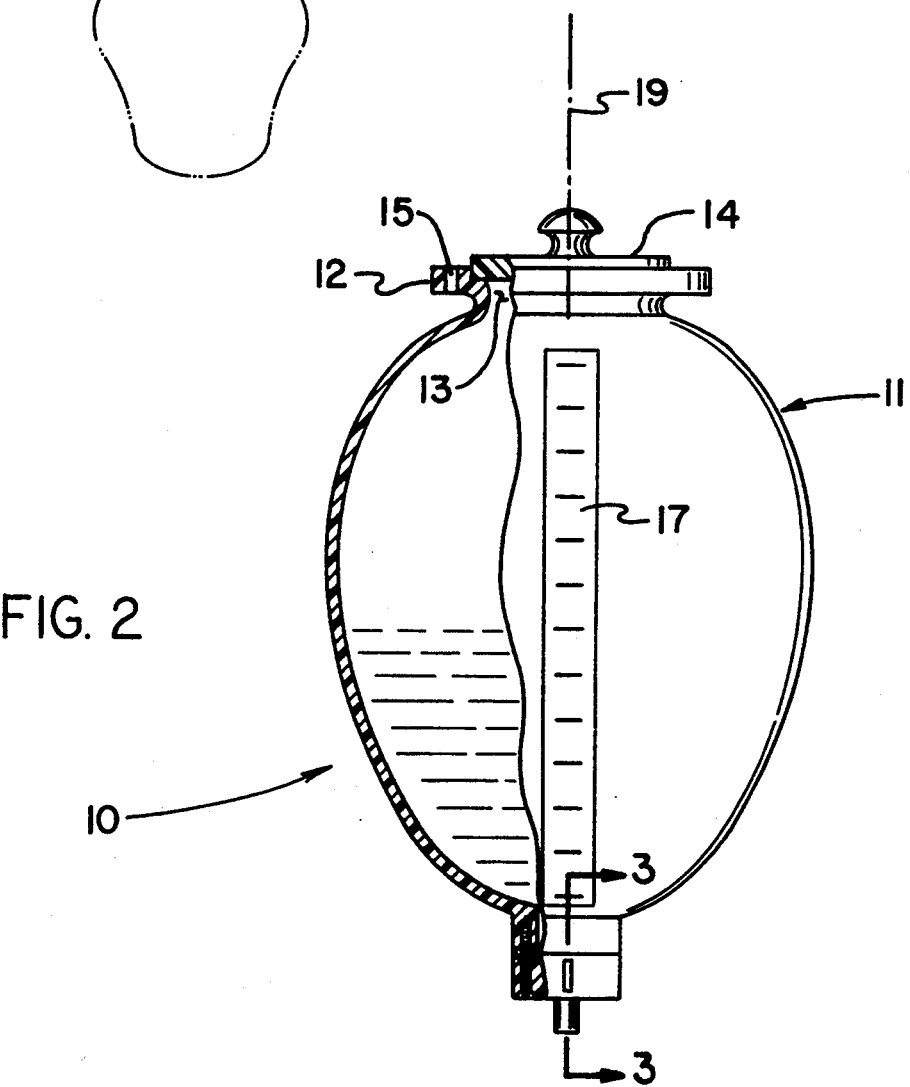
FIG. 2 is an orthographic side view, partially in cross section, of the container structure of the invention.

With reference now to the drawings, and in particular to FIG. 1–4 thereof, a new plant watering apparatus embodying the principles and concepts of the present invention and generally designated by the reference numeral 10 will be described.

Figure 4:
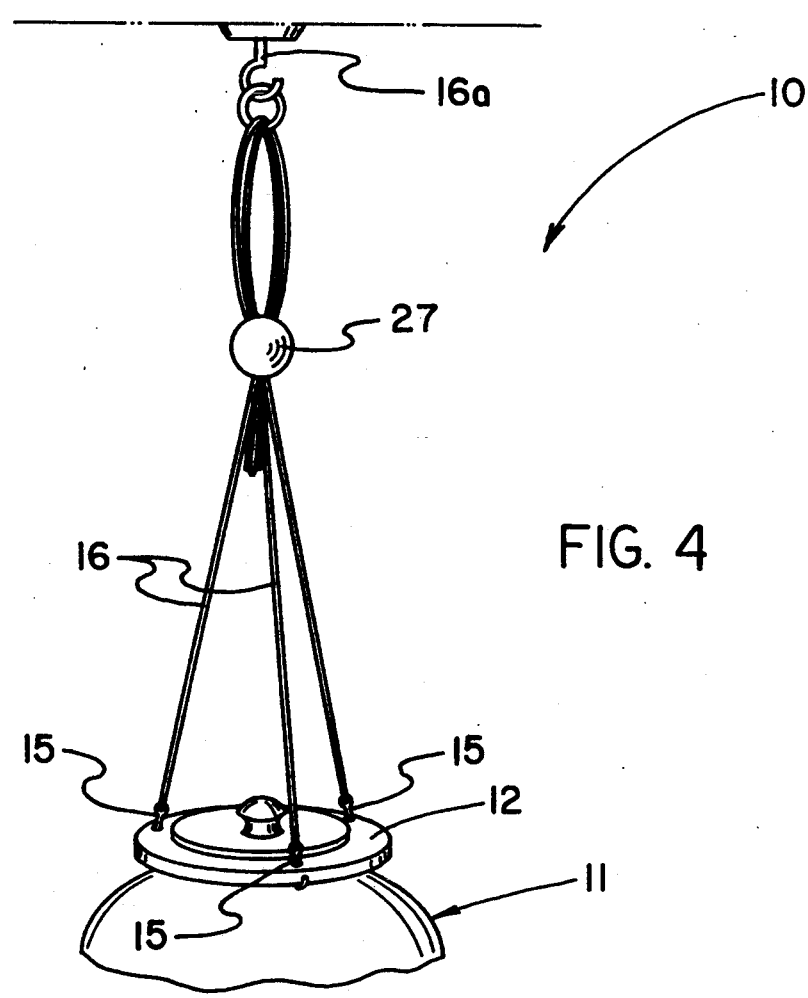
FIG. 4 is an isometric view of the invention indicating mounting of the container relative to support tether lines.

More specifically, the plant watering apparatus 10 of the instant invention comprises a container 11 having a rigid construction and including an entrance flange 12 at an uppermost end of the container, with the entrance flange having a plurality of entrance flange openings 15 to permit the securement and mounting of lower distal ends of flexible support lines 16 thereto, as best illustrated in FIG. 4. The flexible support lines 16 extend upward and are coupled to a support hook 16a at their upper distal ends with a slip collar 27 slidably receiving each of the support lines therethrough to permit the tightening of the support lines in adjacency to the support hook. A lid 14 is removably mounted within an entrance flange opening 13 to permit replenishment of fluid within the container cavity 18. A transparent, graduated window 17 is provided directed along the container and extending therethrough for viewing of available fluid within the container cavity 18, with the window 17 arranged to coextend with the container axis 19, with the container 11 symmetrically oriented thereabout.

Figure 3:
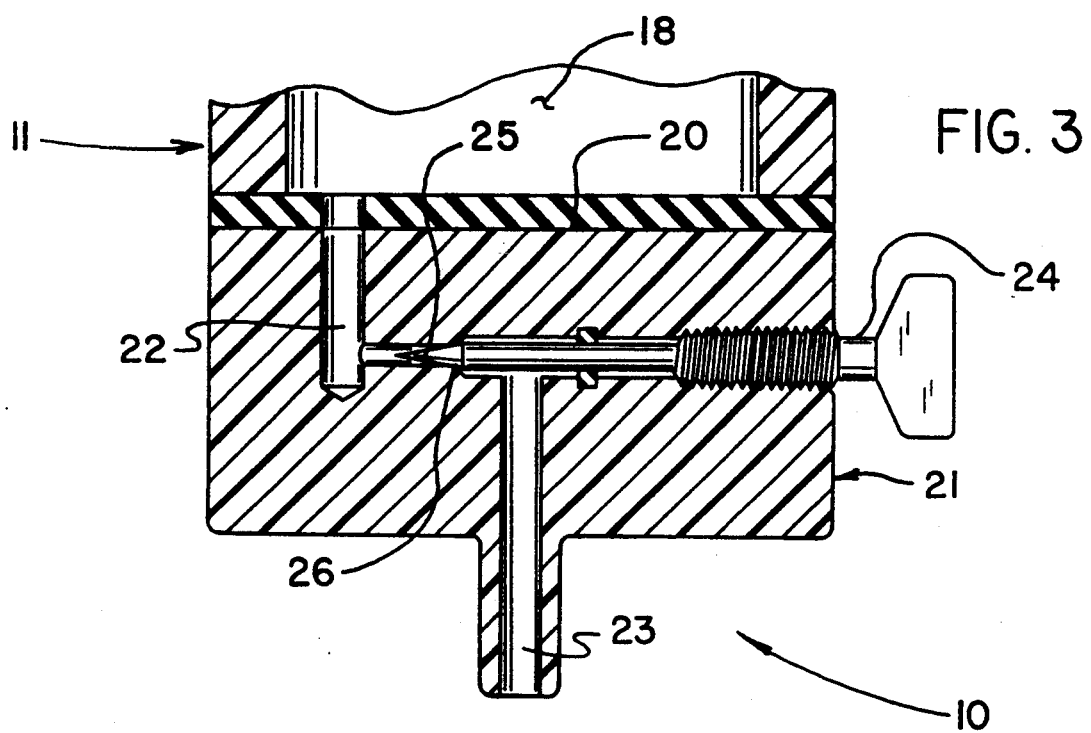
FIG. 3 is an orthographic enlarged illustration of the invention, taken along the lines 3—3 of FIG. 2 in the direction indicated by the arrows.

As best shown in FIG. 3, the container 11 includes a container floor 20 with a valve head 21 mounted to the container floor. A first conduit 22 is directed through the floor 20 in communication with the second conduit 23, with a valve screw 24 having a conical head 25 intersecting the communication and intersection of the first and second conduits 22 and 23 relative to one another, and the conical head 25 is arranged for selective displacement relative to a valve seat 26. The valve screw 24 is directed into the second conduit 23 to permit selective fluid flow therethrough metering fluid through the second conduit as received from the first conduit 22. To this end, the cavity 18 is arranged for the receiving of water and/or a water-fertilizer mixture for the respective watering and/or feeding of an underlying plant, such as indicated in the FIG. 1.

As to the manner of usage and operation of the instant invention, the same should be apparent from the above disclosure, and accordingly no further discussion relative to the manner of usage and operation of the instant invention shall be provided.

Thus, while the present invention has been shown in the drawings and fully described above with particularity and detail in connection with what is presently deemed to be the most practical and preferred embodiment(s) of the invention, it will be apparent to those of ordinary skill in the art that many modifications thereof may be made without departing from the principles and concepts set forth herein, including, but not limited to, variations in size, materials, shape, form, function and manner of operation, assembly and use.

Hence, the proper scope of the present invention should be determined only by the broadest interpretation of the appended claims so as encompass all such modifications as well as all relationships equivalent to those illustrated in the drawings and described in the specification.

Finally, it will be appreciated that the purpose of the Abstract provided at the beginning of this specification is to enable the U.S. Patent and Trademark Office and the public generally, and especially the scientists, engineers and practitioners in the art who are not familiar with patent or legal terms of phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

What is claimed as being new and desired to be protected by Letters Patent of the United States is as follows:

1. A plant watering apparatus comprising:
   a rigid container symmetrically oriented about an axis, with an entrance flange directed into the container through a first end of the container about the axis, with the entrance flange having an entrance opening positioned medially thereof, the entrance flange including a plurality of flange openings radially spaced an equal distance relative to one another, the container further including a container cavity, the container further including a cavity floor;
   a plurality of flexible support lines, each of the support lines being secured to an individual one of the flange openings and extending therefrom;
   a lid removably mounted within the entrance opening;
   a valve head mounted to the container adjacent the cavity floor symmetrically oriented about the axis, with the valve head having a first conduit in fluid communication with the cavity, and the first conduit in fluid communication with a second conduit, with the second conduit positioned within the valve head; and,
   a valve screw in fluid communication with the second conduit to permit selective fluid flow therethrough.

2. An apparatus as set forth in claim 1, and further comprising a support hook coupled to upper distal ends of the support lines, and a slip collar slidably receiving each of the support lines therethrough to permit the tightening of the support lines in adjacency to the support hook.

3. An apparatus as set forth in claim 2, and further comprising a transparent, graduated window directed along the container and extending therethrough for viewing of available fluid within the container cavity, with the window being coextensive with the container axis.

4. An apparatus as set forth in claim 3, wherein the entrance flange is shaped so as to define an annular recess extending along an interior perimeter thereof, with the lid being removably positioned within the annular recess to removably mount the lid to the entrance flange.

5. An apparatus as set forth in claim 4, and further comprising a plurality of threaded fasteners, wherein the threaded fasteners are directed through the valve head and threadably engaged to the container floor to removably mount the valve head relative to the container floor.

6. An apparatus as set forth in claim 5, wherein the valve head is shaped so as to define a valve seat conduit having a valve seat formed therein, wherein the first conduit communicates with the second conduit through the valve seat conduit, wherein the valve screw is threadably engaged to the valve body so as to extend across a portion of the second conduit and into the value seat conduit, the valve screw including a conical head positioned for selective displacement relative to the valve seat to permit and preclude fluid communication between the first conduit and the second conduit.

* * * * *